US006947738B2

(12) United States Patent
Skog et al.

(10) Patent No.: US 6,947,738 B2
(45) Date of Patent: Sep. 20, 2005

(54) MULTIMEDIA MESSAGING SERVICE ROUTING SYSTEM AND METHOD

(75) Inventors: Robert Skog, Hasselby (SE); Eniko Torok, Vallingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 494 days.

(21) Appl. No.: 10/024,304

(22) Filed: Dec. 21, 2001

(65) Prior Publication Data

US 2002/0126708 A1 Sep. 12, 2002

Related U.S. Application Data

(60) Provisional application No. 60/262,040, filed on Jan. 18, 2001.

(51) Int. Cl.[7] .................................................. H04Q 7/20

(52) U.S. Cl. ................................ 455/426.1; 455/412.1; 455/412.2; 455/414.1; 455/466; 709/206; 709/249; 379/88.11; 379/88.12; 379/88.13; 370/338; 370/400; 370/401; 370/328; 370/329; 370/486

(58) Field of Search .................. 455/466, 412.1–412.2, 455/414.1, 426.1, 414.3, 413; 709/206, 203, 249; 370/400–401, 328–329, 352–356, 338; 379/88.11–88.14

(56) References Cited

U.S. PATENT DOCUMENTS

| | | | | | |
|---|---|---|---|---|---|
| 5,742,668 | A | * | 4/1998 | Pepe et al. | 455/415 |
| 5,878,397 | A | * | 3/1999 | Stille et al. | 455/466 |
| 5,946,629 | A | * | 8/1999 | Sawyer et al. | 455/466 |
| 5,946,630 | A | * | 8/1999 | Willars et al. | 455/466 |
| 5,974,449 | A | * | 10/1999 | Chang et al. | 709/206 |
| 6,085,100 | A | * | 7/2000 | Tarnanen | 455/466 |
| 6,169,897 | B1 | * | 1/2001 | Kariya | 455/456.3 |
| 6,233,458 | B1 | * | 5/2001 | Haumont et al. | 455/445 |
| 6,275,693 | B1 | | 8/2001 | Lin et al. | |
| 6,292,473 | B1 | * | 9/2001 | Duske et al. | 370/316 |
| 6,304,564 | B1 | * | 10/2001 | Monin et al. | 370/338 |
| 6,310,862 | B1 | * | 10/2001 | Roy | 370/260 |

(Continued)

FOREIGN PATENT DOCUMENTS

| | | | | |
|---|---|---|---|---|
| WO | WO 99 61966 A | | 12/1999 | |
| WO | WO 99 66746 A | | 12/1999 | |
| WO | WO 9966746 A2 | * | 12/1999 | H04Q/7/22 |
| WO | WO 00 57610 A | | 9/2000 | |
| WO | WO 01 33781 A | | 5/2001 | |

OTHER PUBLICATIONS

"Wireless Application Protocol, Multimedia Messaging Service, Architecture Overview Specification," WAP–205–MMSArchOverview–20010425–a, WAP MMS Architecture Overview, Version 25, Apr. 2001.

*Primary Examiner*—William Trost
*Assistant Examiner*—Sharad Rampuria

(57) ABSTRACT

A multimedia messaging system for sending and receiving multimedia MMS messages. The MMS messages are sent to a MMS server and addressed to the recipient's MSISDN number. MMS server sends a notification to a PAP server that sends the notification as a WAP Push to the recipient mobile device telling the mobile device to retrieve the message. If the recipient mobile device is engaged in an on going or dedicated session with the Internet, the notification is sent to the recipient mobile device during the session. The recipient mobile device then initiates a HTTP GET request to retrieve the multimedia message via the voice or data channel of a PLMN. If the recipient mobile device is not engaged in an on going or dedicated session with the Internet, the notification is sent to the recipient mobile device as a WAP Push using SMS as bearer via the signaling channel of the PLMN. The recipient mobile device then initiates a HTTP GET request to retrieve the multimedia message via the voice or data channel of the PLMN.

20 Claims, 4 Drawing Sheets

U.S. PATENT DOCUMENTS

| | | | | | |
|---|---|---|---|---|---|
| 6,333,973 | B1 | * | 12/2001 | Smith et al. | 379/88.12 |
| 6,356,543 | B2 | * | 3/2002 | Hall et al. | 370/352 |
| 6,370,399 | B1 | * | 4/2002 | Phillips | 455/564 |
| 6,393,014 | B1 | * | 5/2002 | Daly et al. | 370/352 |
| 6,401,113 | B2 | * | 6/2002 | Lazaridis et al. | 709/207 |
| 6,424,828 | B1 | * | 7/2002 | Collins et al. | 455/412.1 |
| 6,430,409 | B1 | * | 8/2002 | Rossmann | 455/422.1 |
| 6,434,133 | B1 | * | 8/2002 | Hamalainen | 370/338 |
| 6,463,134 | B1 | * | 10/2002 | Okada et al. | 379/93.24 |
| 6,496,690 | B1 | * | 12/2002 | Cobo et al. | 455/408 |
| 6,501,956 | B1 | * | 12/2002 | Weeren et al. | 455/463 |
| 6,512,756 | B1 | * | 1/2003 | Mustajarvi et al. | 370/341 |
| 6,519,468 | B1 | * | 2/2003 | Donovan et al. | 455/466 |
| 6,587,693 | B1 | * | 7/2003 | Lumme et al. | 455/466 |
| 6,600,732 | B1 | * | 7/2003 | Sevanto et al. | 370/349 |
| 6,693,652 | B1 | * | 2/2004 | Barrus et al. | 715/838 |
| 6,718,168 | B2 | * | 4/2004 | Ala-Luukko et al. | 455/412.1 |
| 6,718,178 | B1 | * | 4/2004 | Sladek et al. | 455/466 |
| 6,738,635 | B1 | * | 5/2004 | Lewis et al. | 455/466 |
| 6,795,711 | B1 | * | 9/2004 | Sivula | 455/466 |
| 6,813,638 | B1 | * | 11/2004 | Sevanto et al. | 709/227 |
| 6,848,008 | B1 | * | 1/2005 | Sevanto et al. | 709/249 |
| 2001/0005675 | A1 | * | 6/2001 | Aho | 455/412 |
| 2001/0031633 | A1 | * | 10/2001 | Tuomela et al. | 455/417 |
| 2001/0053687 | A1 | | 12/2001 | Sivula | |
| 2002/0032027 | A1 | * | 3/2002 | Kirani et al. | 455/426 |
| 2002/0123359 | A1 | * | 9/2002 | Wei et al. | 455/466 |
| 2003/0018806 | A1 | * | 1/2003 | Rueger et al. | 709/238 |
| 2003/0032437 | A1 | * | 2/2003 | Bossemeyer et al. | 455/466 |

OTHER PUBLICATIONS

"Wireless Application Protocol," WAP–209–MMS-Encapsulation–20010601–a, Wireless Application Protocol, MMS Encapsulation Protocol, Version 01–Jun. 2001.

Novak, L. et al.: "MMS–Building on the Success of SMS," Ericsson Review No. 3, 2001.

"Multimedia Messaging Service (MMS)" 3G TS 23140 V1.0.0., 3GPP, Dec. 1999, pp. 1–27, XP002902593 cited in the applicaton Sections 5.1, 6.2–6.5, 8.1–8.5.3.

* cited by examiner

MULTIMEDIA MESSAGING SERVICE ROUTING SYSTEM AND METHOD

This application claims priority under 35 U.S.C. §119 to U.S. Provisional Application No. 60/262,040 entitled MMS ROUTING and filed on Jan. 18, 2001, the entire content of which is hereby incorporated by reference.

BACKGROUND

The present invention relates to Multimedia Messaging Service (MMS), and more particularly to sending an MMS message notification to a recipient mobile device via a public land mobile network (PLMN) and, if needed, a public switched telephone network (PSTN) and another PLMN.

In recent years, users of mobile devices, e.g., mobile telephones and pagers, have sent messages to one another using Short Messaging Service (SMS). Mobile radio networks utilize SMS in Global System for Mobile Communications (GSM) networks. Messages are coordinated between the sender and the recipient using the sender's and recipient's respective Mobile Service Integrated Services Digital Network (MSISDN) numbers. These are essentially the phone numbers of the mobile devices. The SMS is integrated into the mobile radio communications network, thus it can use the mobile radio networks addressing and routing system to send messages to the mobile devices connected to the network. The SMS framework cannot be used for multimedia messaging because it is only possible to convey ASCII text messages of very limited sizes (up to 160 characters). This is because the SMS messages are sent over the signaling channel of the mobile radio network.

For the past several years, email communications over the Internet have proliferated. Email messages are routed over the Internet using Simple Mail Transfer Protocol (SMTP) and email addresses. People wishing to use the Internet to send email messages are provided with an email account having an individualized email address. The Internet was created to allow computers to communicate with one another via a universal network. This in turn, allows users of the computers to share information and messages with one another. Communication between computers connected to the Internet is made possible with the Transmission Control Protocol/Internet Protocol (TCP/IP). This networking protocol provides for communication across interconnected networks, between computers with diverse hardware architectures and various operating systems. Part of user's enthusiasm for sending email stems from email's capability of including attachments of generally unlimited size. These attachments can include: image files; video files; sound files; and combination video and sound files. Accordingly, friends and family members can attach multimedia files to their email messages to share pictures, sounds and video with one another which enhances the communication experience.

Compared to personal computers, mobile devices are limited in their processing capacity due to battery limitations and consumer demand for small devices. While it is possible to send and receive email to and from a mobile device, the process is cumbersome and limited. One of the main problems with using email with a mobile device is the complexity of the system and the login procedures. Another problem is that it is not possible to push the email message to the recipient. Instead, the recipient has to pull new messages from a server connected to the Internet. Yet another problem is that there are no limitations on the content of email messages whatsoever. Therefore, attachments of unknown size and unknown formats may be included which may overwhelm the mobile device or mobile radio communication network.

As technology has evolved, bandwidth in mobile radio networks has greatly increased. This increased bandwidth makes it possible for users of mobile devices to send larger messages to one another. These larger messages can include text, images, video and sound. In addition, processing and memory capacity of mobile devices has advanced permitting multimedia messages to be stored in and presented by the mobile device. Therefore, it is now possible and desirable to send multimedia messages to users of mobile devices. The Third Generation Partnership Project (3GPP) initiated the standardization of MMS where the requirements for the first release (release 99) were defined in the following documents: Multimedia Messaging Service: Service aspects; Stage 1, Third Generation Partnership Project TS 22.140 Release 1999, available from www.3gpp.org/ftp/Specs/; and Multimedia Messaging Service: Functional description; Stage 2, Third Generation Partnership Project TS 23.140 Release 1999, available from www.3gpp.org/ftp/Specs/, both of which are hereby incorporated by reference.

MMS has evolved from the popularity of the SMS messaging system and uses the Wireless Application Protocol (WAP). WAP is a protocol that permits mobile devices to communicate with Internet servers via the mobile radio communications network. Since displays on mobile devices are much smaller (typically, 150×150 pixels) than computer monitor displays (typically, at least 640×480 pixels), a website designed to be displayed on a computer monitor cannot be displayed on a mobile device with any practicality. Also, mobile devices have considerably less processing power than personal computers. Accordingly, WAP was developed to allow mobile devices to access special Internet sites that are designed to be displayed on a mobile device and to provide an interface between the mobile device and the Internet. A user of a WAP enabled mobile device can access the Internet via the mobile radio communications network to shop, get stock quotes, get traffic and weather reports, etc.

MMS is a standard for sending and receiving multimedia messages. The multimedia messages can include any combination of formatted text, images, photographs, audio and video clips. The images can be in any standard format such as GIF and JPEG. Video formats such as MPEG4 and audio formats such as MP3 and MIDI are also supported by MMS. The WAP MMS specifications describe the format for the MMS messages from MMS Proxy Relay to the User Agent at the terminal with the mandatory steering field (Encapsulation document) and the sequence of these messages (Messaging Service Document) in the following documents: Multimedia Messaging Service: Service aspects; Stage 1, Third Generation Partnership Project TS 22.140 Release 4 (V4. 1.0), available from www.3gpp.org/ftp/Specs/; and Multimedia Messaging Service: Functional description; Stage 2, Third Generation Partnership Project TS 23.140 Release 4 (V4.2.0), available from www.3gpp.org/ftp/Specs/, both of which are hereby incorporated by reference.

The typical format of an MMS message is illustrated in FIG. 1. The MMS message includes headers 1. The headers 1 provide the routing information and addresses of the recipients and senders of the MMS message. The message body 2 includes the multimedia message which may include: images 3, which may be in the form of JPEG; formatted or plain text 4; audio 5, which may be in the form of a wave file; video 6, which may be in the form of a MPEG file; and may optionally include a presentation file 7 which presents the multimedia content to the recipient of the multimedia message.

MMS was created, in part, to overcome the aforementioned problems associated with using email with mobile devices. SMS messages are short allowing them to be transmitted on the signaling channel of the mobile radio communications network. MMS messages are much larger requiring that they be sent over the voice or data channel of the mobile radio communications network. The MMS can be seen as a new messaging framework defined in the "border" between the Internet and telecommunications, i.e., the clients are connected to the mobile telecommunications network and the servers are connected to the Internet. MMS messages are sent between mobile devices and MMS servers over the voice or data channel during dedicated sessions between the mobile device and MMS servers using WAP. This can be analogized as being similar to a session between a personal computer and the Internet using a modem and dial-up connection.

In SMS, messages are sent and received over the mobile communications network using MSISDN numbers of the respective mobile devices. Likewise, an MMS message can be addressed to the recipient's MSISDN number. As discussed above, MMS messages are routed through the Internet using SMTP. This presents a problem because once the message gets to the sender's MMS server, the MMS server wants to route the message to the recipient's MMS server, but does not know the recipient's MMS server address. The MMS message may be addressed only to the recipient's MSISDN number which provides no indication by itself of the recipient's MMS server. Accordingly, some way of associating the recipient's MMS server address with the recipient's MSISDN number is required.

What is needed, therefore, is a system and method to notify a recipient of a multimedia message by a sender of the multimedia message via the mobile radio communication network telling the recipient mobile device to retrieve the multimedia message from the Internet. This system and method, thereby, eliminates the problem of routing MMS messages through the Internet when the message is addressed with only a MSISDN number.

SUMMARY OF THE INVENTION

The foregoing and other objects are achieved in MMS routing methods and systems for use in routing messages through the Internet. In accordance with one aspect of the invention, a SMS notification is sent to a mobile device, wherein the SMS notification indicates that a multimedia message is available to be retrieved by the mobile device. In response to receipt of the SMS notification, the multimedia message is automatically retrieved and stored in the mobile device.

In another aspect of the invention, a WAP notification is sent to a mobile device, wherein the WAP notification indicates that a multimedia message is available to be retrieved by the mobile device. In response to receipt of the WAP notification, the multimedia message is automatically retrieved and stored in the mobile device.

In another aspect of the invention, in a server, logic configured to send a SMS notification to a mobile device in response to receipt of a multimedia message. In a mobile device, logic configured to receive a SMS notification, wherein the notification indicates that a multimedia message is available to be retrieved by the mobile device. Logic configured to automatically retrieve and store the multimedia message in the mobile device in response to receiving the SMS notification.

In another aspect of the invention, in a server, logic configured to send a WAP notification to a mobile device in response to receipt of a multimedia message. In a mobile device, logic configured to receive a WAP notification, wherein the notification indicates that a multimedia message is available to be retrieved by the mobile device. Logic configured to automatically retrieve and store the multimedia message in the mobile device in response to receiving the WAP notification.

BRIEF DESCRIPTION OF THE DRAWINGS

The objects and advantages of the invention will be understood by reading the following detailed description in conjunction with the drawings in which.

DETAILED DESCRIPTION OF THE INVENTION

Figure 1:
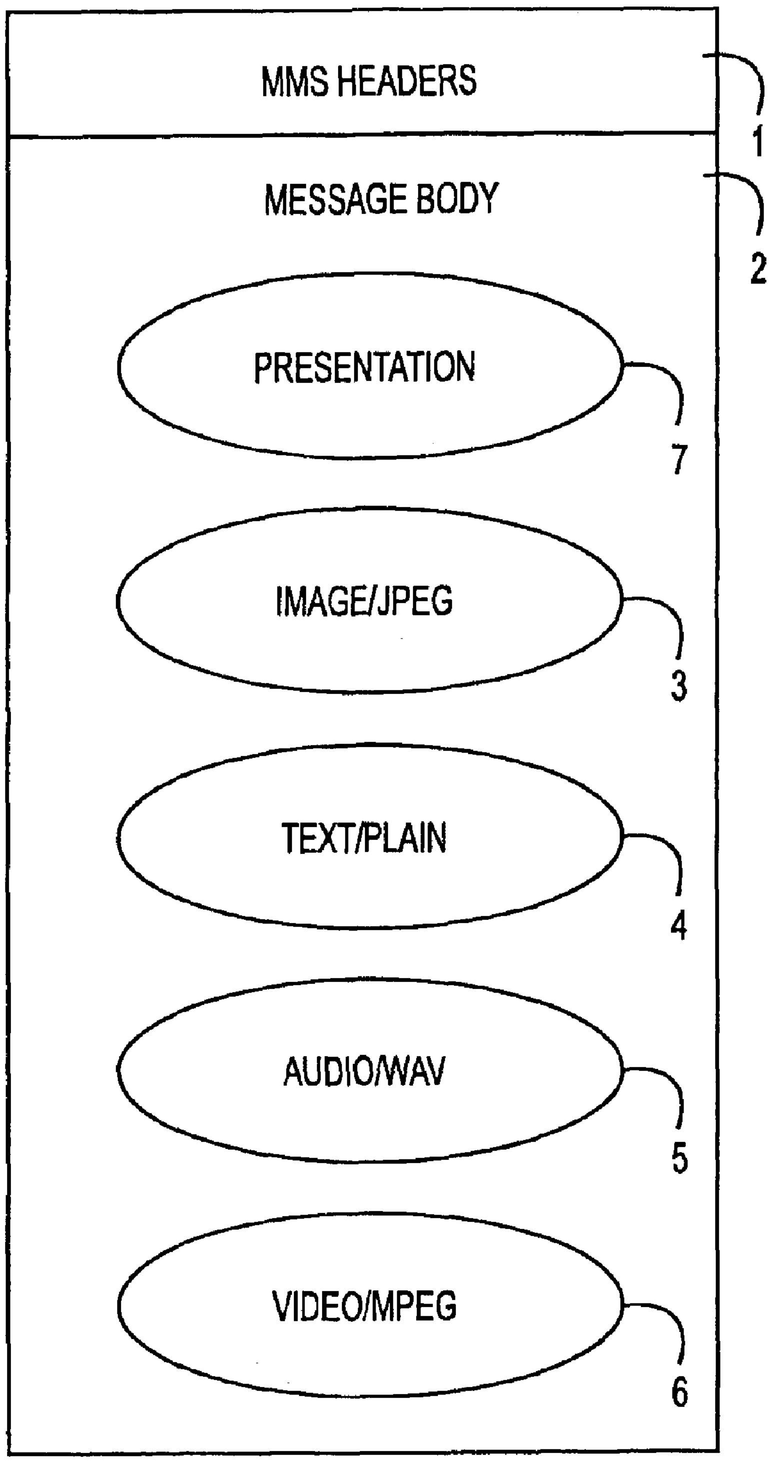
FIG. 1 depicts the format of a MMS message.

The various features of the invention will now be described with reference to the figures, in which like parts are identified with the same reference characters.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well known methods, devices, types of networks, and circuits are omitted so as not to obscure the description of the present invention.

The MMS can be described as a new messaging framework seeking to fill the gap between mobile radio communication networks and the Internet, i.e., users of mobile devices are sending messages to one another via mobile radio communications networks, and users connected to the Internet are communicating with one another via servers connected to the Internet using Simple Mail Transfer Protocol (SMTP) and email addresses. However, routing messages from mobile devices which are addressed with MSISDN numbers through the Internet is still an unresolved problem.

Figure 2:
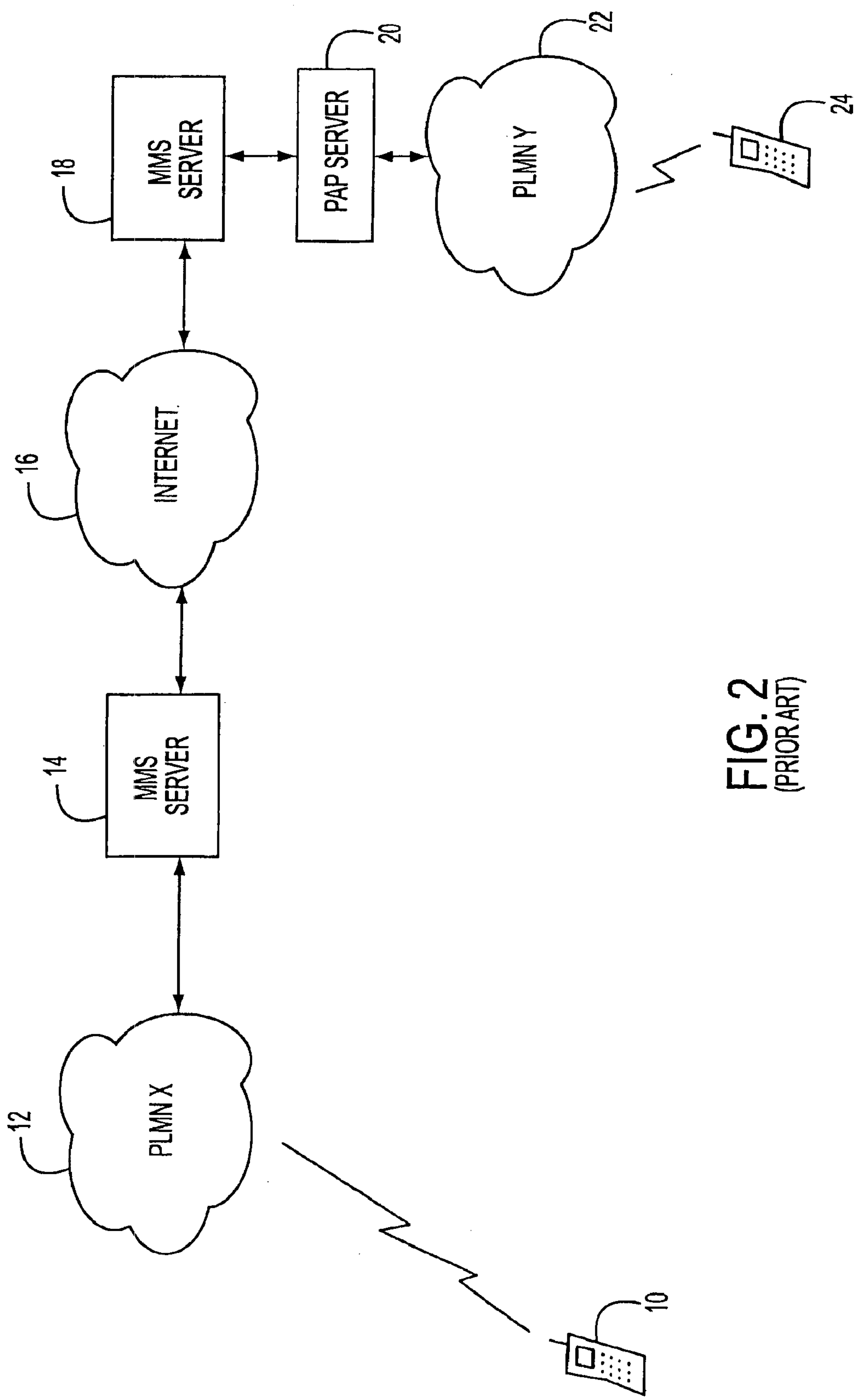
FIG. 2 depicts a standard MMS traffic routing sequence.

A prior art MMS traffic routing sequence is illustrated in FIG. 2. A user of a mobile device 10 has an MMS message that the user would like to send to another mobile device 24. The mobile device 10 sends the MMS message to an MMS server 14 via PLMN X 12. The MMS server routes messages through the Internet using SMTP and an e-mail address. Since the message sent by mobile device 10 was addressed to the recipient's MSISDN number, the MMS server 14 must determine the address of the recipient's MMS server in order to route the multimedia message to the recipient's MMS server. If the MMS server 14 is able to identify the MMS server of the recipient mobile device 24 by its MSISDN number, the multimedia message is routed to the recipients MMS server 18 via the Internet using SMTP and an email address of the recipient's MMS server. The MMS server 18 then sends a multimedia message notification to a Push Access Protocol (PAP) server 20. The PAP server 20 is a Push Gateway for pushing messages to the mobile device 24 using the WAP forum standard. The PAP server 20 sends a notification to the mobile device 22 via a second Public Land Mobile Network Y (PLMN Y) 22. The recipient mobile device 24 pulls the MMS message from MMS server 18 via PLMN Y 22. In response to the mobile device's 24 pull, the MMS server 18 routes the multimedia message to the recipient mobile device 24 via the PLMN Y 22. The multimedia message is received in the mobile device 24 where it can be presented, played, or displayed to a user of the mobile device 24.

A major shortcoming of this routing system is that the sender's MMS server must determine the routing to the recipient's MMS server. Since the MMS message sent from the mobile device 10 is addressed only to the recipient's MSISDN number, the MMS server must determine an address for the recipient's MMS server based on the recipient's MSISDN number. The MMS server may not be able to associate the recipient's MSISDN number with the recipient's MMS server making it impossible to route the MMS message. If the sending mobile device 10 and receiving mobile device 24 share the same MMS server 14, then there is no need to transfer the MMS message to another MMS server. However, the routing of the MMS message is still unresolved and is believed to be complicated.

One proposed solution to the problem of coordinating MSISDN numbers with SMTP and email addresses is ENUM. The acronym ENUM refers to the Internet Engineering Task Force (IETF) protocol that takes a complete international telephone number and resolves it into a series of Uniform Resource Locators (URLs) using a Domain Name System (DNS) based architecture. ENUM is an unfinished standard for converting MSISDN numbers to URL addresses in the Domain Name System (DNS) environment. An ENUM based server would have to be available to all MMS servers in order to make the MSISDN to email conversion possible. ENUM is based on the Domain Name System (DNS). The conversion from MSISDN number to an SMTP and email address makes it possible to route the multimedia message through the Internet to a MMS server that is accessible to a recipient mobile device. A country code in the MSISDN number could be used to route the message to a ENUM server in that country. Each country would maintain a database for routing MMS messages to users in that country. However, deployment of the ENUM standard could be costly and unevenly distributed due to different socioeconomic levels in each country. This would lead to a system that could not deliver all MMS messages to their intended recipients. Another complication is that if the ENUM standard were to be installed at multiple locations, it may be difficult to continuously update all of the installations when a user is added, dropped, has changed their email address, has changed their MSISDN, or has changed their service provider, but maintained the same MSISDN number, i.e., number portability.

Another possible solution is an internal table within the MMS server. This table needs to be updated each time a user changes his/her mobile telephone service provider or Internet Service Provider (ISP). For example, a user may desire to use an MMS server address of the user's ISP instead of the one provided by the user's mobile telephone service provider. This means that the mobile telephone service provider must update the internal table so that the user's MSISDN number points to the address of the MMS server belonging to the ISP. Not only does the user's mobile telephone service provider need to make this update, but also all other MMS servers must update their internal databases so that all of the MMS servers are aware of the new routing address to the user's ISP. This will likely cause there to be too many updates causing the tables to become unsynchronized. Without all of the tables being synchronized, some of the data in the tables will be wrong making it impossible for some of the multimedia messages to be routed to their intended recipients.

The present invention solves the aforementioned problems with the MMS traffic routing sequence illustrated in FIG. 2 without requiring the complicated conversion schemes of database tables and ENUM.

Figure 3:
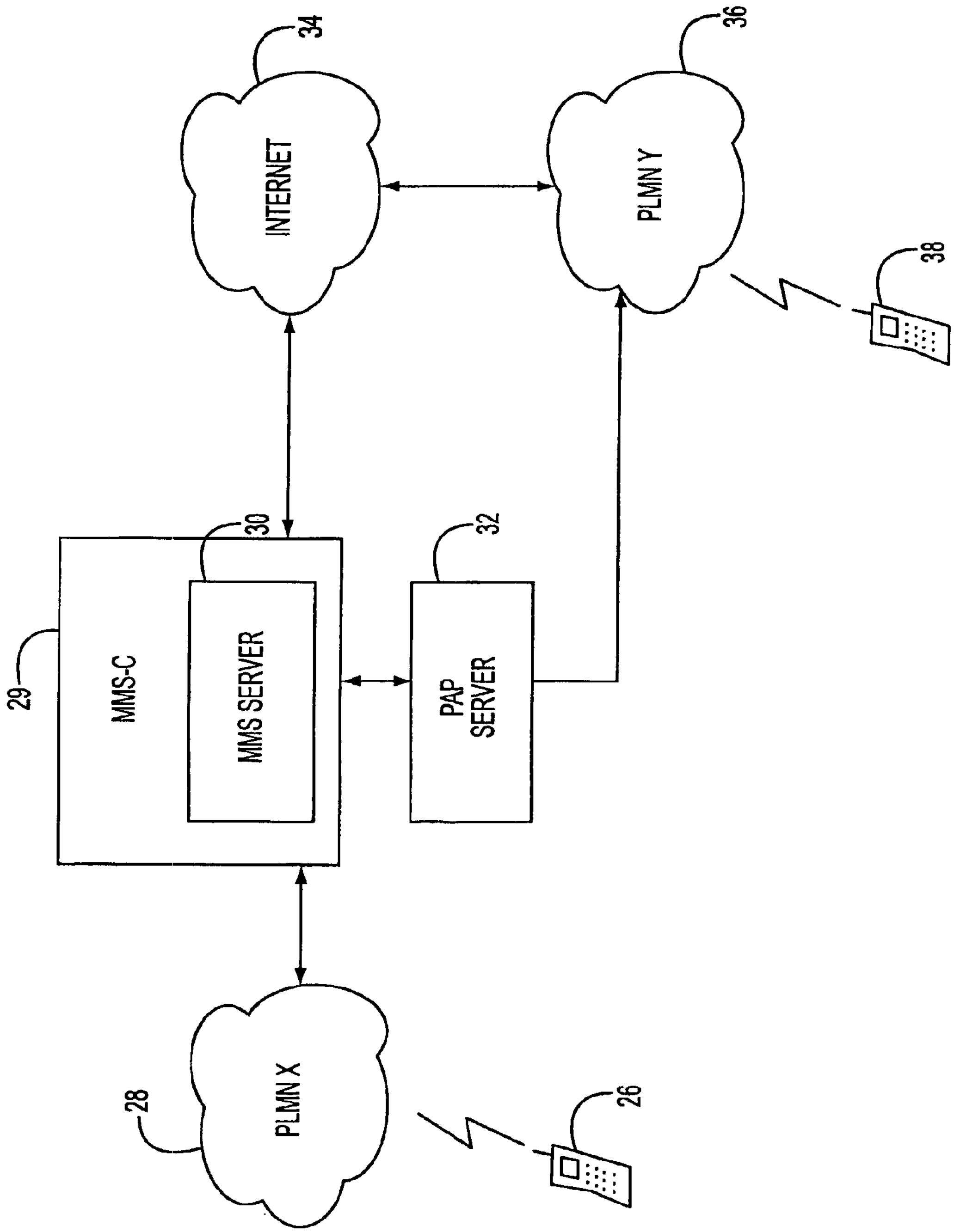
FIG. 3 depicts the MMS traffic routing sequence of the present invention.

An embodiment of the MMS routing system and method of the present invention is illustrated by FIG. 3. The user of a mobile device 26 has an MMS message that the user would like to send to a recipient mobile device 38. The MMS message is sent from the mobile device 26 to Multimedia Messaging Service Center (MMS-C) 29 which includes a MMS server 30 via PLMN X 28 during an on going or dedicated session with the Internet. The MMS-C 29 is a combination of a MMS server and a MMS proxy relay for handling MMS messages for subscribers to the MMS-C 29. The MMS message is transmitted to the MMS-C 29 and MMS server 30 using the voice or data channel of the PLMN X 28. The MMS message is initially WAP message generated in the mobile device 26 and reaches the MMS-C via HTTP. A notification is sent from the MMS server 30 to a Push Access Protocol (PAP) server 32. The PAP server 32 is a push gateway for pushing messages using WAP.

In the event that the recipient mobile device 38 is engaged in an on going or dedicated session with the Internet at the time the notification is to be sent, the PAP server can send the notification directly to the recipient mobile device 38 using WAP provided that both the sender and recipient mobile devices are using the same PLMN. If the mobile device is not engaged in a dedicated session with the Internet and is using the same PLMN as the MMS server, the MMS message notification is sent through the common PLMN using SMS as bearer of the MMS message notification, i.e., the MSISDN number of the recipient mobile device is used to route the MMS message notification by sending the MMS message notification as a SMS message to the recipient mobile device. If the recipient mobile device is connected to a PLMN other than a common PLMN, the SMS message is routed from PLMN X 28 through a PSTN (not shown) to the PLMN Y 36 of the recipient mobile device and delivered to the recipient mobile device. Since the notification is sent from the sender's MMS-C 29 via the PAP server to the recipient mobile device using SMS as bearer of the notification, there is no need to do an address conversion because the MMS message is not routed through the Internet by the sender's MMS-C 29.

In either case, the SMS message arrives at the recipient mobile device 38. The SMS message contains the MMS message notification which is a WAP push. The mobile device 38 may be configured in such a manner as to automatically extract the WAP push from the SMS message. In response to the WAP push, the recipient mobile device 38 may initiate a dedicated session with the Internet, and send a HTTP GET request using WAP to retrieve the MMS message sent by mobile device 26 via the voice or data channel of a PLMN from the sender's MMS-C. The MMS message is received in the mobile device 38 where it is stored and can be presented, played, or displayed to a user of the mobile device 38. Thus, it is the recipient mobile device that retrieves the message from the sender's MMS-C 29 eliminating the need to route the message through the Internet to a MMS server of the recipient.

Figure 4:
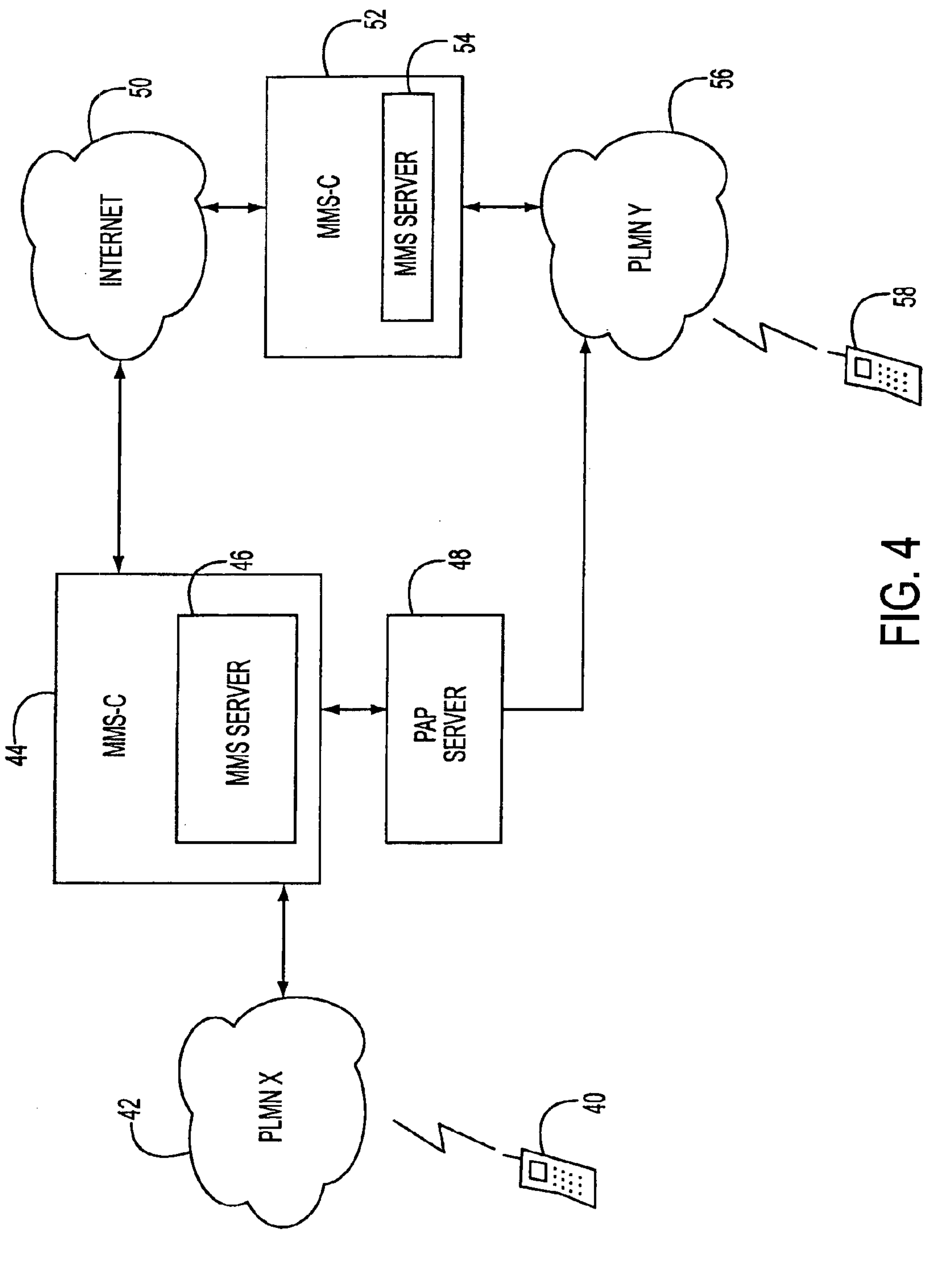
FIG. 4 depicts the MMS traffic routing sequence of another embodiment of the present invention.

Another embodiment of the MMS routing system and method of the present invention is illustrated by FIG. 4 and the following discussion where it is also possible for the recipient's MMS-C 52 to retrieve the MMS message from the sender's MMS-C 44. In this scenario, the recipient mobile device 58 has its own MMS-C 52 between the PLMN Y 56 and the Internet 50. The sending mobile device 40 sends a MMS message to the sending mobile device's MMS-C 44 via PLMN X 42. The MMS server 46 of MMS-C 44 sends a notification of a new MMS message to the PAP server 48. The PAP server 48 sends a new MMS message notification to the recipient mobile device 58. The recipient mobile device 58 receives the notification of a new MMS message from the PAP server 48 as described above with respect to FIG. 3. In response to the notification of a new MMS message, the recipient mobile device 58 requests that the recipient's MMS-C 52 retrieve the MMS message from the sender's MMS-C 44. The notification of a new MMS message includes information to guide the recipient's MMS-C 52 through the Internet 50 to the sender's MMS-C 44 to retrieve the MMS message from the sender's MMS-C 44. The recipient's MMS-C 52 then transfers the MMS message to the recipient mobile device 58 via PLMN Y 56 where it is stored and presented to the user of the recipient mobile device 58.

It will be appreciated by those skilled in the art that the MMS notification using SMS can be routed through the telecommunications network using any combination of PLMNs and PSTNs as would any conventional SMS message. For example, if the sending and recipient mobile devices are connected to the same PLMN, the MMS notification using SMS as bearer will be routed to the recipient mobile device using the same PLMN. If however, the sending and recipient mobile devices are connected to different PLMNs, the MMS notification using SMS as bearer will be routed through the PLMN connected to the sender's MMS-C to a PSTN to the PLMN of the recipient mobile device. Thus, the aforementioned addressing drawbacks and problems are solved by this embodiment of the invention as well.

It will also be appreciated by those skilled in the art that a MMS message does not have to originate from a mobile device. For example, it is contemplated that a MMS-C may desire to send a message directly from its associated MMS server to mobile devices using its service. These MMS messages could offer users of the mobile devices discounts, special offers, etc. It is also contemplated that MMS messages can be sent by users of the Internet to mobile devices. In this situation a user would compile a MMS message and send the message via the user's ISP to the mobile device's MMS-C.

Thus, the present invention solves the problem of addressing and routing MMS messages from a mobile radio network through the Internet to the same or another mobile radio network. The addressing problem is caused by the mobile radio network and the Internet using different addressing protocols. These different addressing protocols means that MMS messages addressed with the mobile radio network protocol must be converted to an address protocol of the Internet and then converted back the mobile radio network protocol in order to exchange MMS messages between the Internet and the mobile radio network. The present invention solves this addressing problem by sending a MMS message to a MMS-C and sending a MMS message notification to the recipient's mobile device from the sender's MMS-C telling the recipient mobile device to retrieve the MMS message from the sender's or recipient's MMS-C.

The MMS traffic routing sequence of the present invention does not require an internal table for translating MSISDN addresses to email addresses because the invention uses routing based on MSISDN and the routing of MSISDN is solved in the Signaling System 7 network (SS7). The present invention is also less expensive to implement and introduce to mobile radio telephone networks, in part, because the SMS messaging service is already in place. Because there are no dependencies on new and unproven standards such as ENUM for use on MMS servers. This provides for better in service performance because there are no external or internal tables to look up and there is no reliance on an unproven standard.

The description has focused on the particular communications that take place between clients in the mobile network and servers in the Internet. However, it will be readily apparent to those having ordinary skill in the art that in the preferred embodiments, these communications are mechanized. Such mechanized functions may be embodied in any of a variety of forms, including but not limited to hard-wired circuits, or a processor executing a suitable set of program instructions stored on a computer readable storage medium such as a random access memory (RAM), read only memory (ROM), magnetic storage medium (such as magnetic tape, disk or diskette) or optical storage medium (such as compact disk (CD) ROM). The invention may be embodied in any one or combination of these forms, including but not limited to a computer readable storage medium having the suitable set or program instructions stored thereon. As used herein, the term "logic" shall be used to refer to any and all such forms of embodiment, or portions of such forms of embodiment.

The invention has been described with reference to a particular embodiment. However, it will be readily apparent to those skilled in the art that it is possible to embody the invention in specific forms other than those of the preferred embodiments described above. This may be done without departing from the spirit of the invention. The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of sending a multimedia message from a sender having an associated sender's server to a mobile device having an associated server serving the mobile device, wherein said sender's server is connected to the server serving the mobile device, said method comprising the steps of:

sending a multimedia message from the sender to the sender's server, said multimedia message including an identification number for the mobile device;

sending a notification from the sender's server to the mobile device utilizing the mobile device identification number, wherein the notification includes a network address of the sender's server and indicates that the multimedia message is available for retrieval from the sender's server;

in response to receipt of the notification, sending from the mobile device to the server serving the mobile device, a request to retrieve the multimedia message from the sender's server, wherein the request includes the network address of the sender's server;

retrieving the multimedia message from the sender's server, through the network, by the server serving the mobile device;

retrieving by the mobile device, the multimedia message from the server serving the mobile device; and storing the multimedia message in the mobile device.

2. The method of claim 1, wherein the mobile device is a mobile telephone.

3. The method of claim 1, further comprising sending the multimedia message to the sender's server from a second mobile device.

4. The method of claim 3, wherein the mobile device and the second mobile device are mobile telephones.

5. The method of claim 4, wherein the mobile telephones are in a same or different public land mobile network (PLMN), and are addressed with Mobile Station Integrated Services Digital Network (MSISDN) identification numbers.

6. The method of claim 1, further comprising:

sending the notification using Short Messaging Service (SMS) as bearer and addressed to the mobile device's Mobile Station Integrated Services Digital Network (MSISDN) identification number.

7. The method of claim 1, wherein the sender's server and the server serving the mobile device are Multimedia Messaging Service (MMS) servers.

8. The method of claim 7, further comprising:

sending the notification from the sender's MMS server to a Push Access Protocol (PAP) server associated with the mobile device; and sending the notification from the PAP server to the mobile device, wherein the notification includes a Wireless Application Protocol (WAP) Push.

9. The method of claim 8, further comprising sending, in response to the WAP Push, a hypertext transfer protocol (HTTP) GET request from the mobile device to the server serving the mobile device in order to automatically retrieve the multimedia message.

10. The method of claim 7, further comprising sending the multimedia message from a second mobile device to the senders MMS server.

11. A system for sending a multimedia message from a sender having an associated senders server to a destination mobile device having an associated server serving the mobile device, wherein said senders server is connected to the server serving the mobile device, the system comprising:

in the sender's server, logic configured to:

initially receive the multimedia message from the sender, said multimedia message including an identification number for the destination mobile device; and send a notification of the multimedia message to the mobile device utilizing the mobile device identification number, wherein the notification includes network address of the sender's server and indicates that a multimedia message is available for retrieval from the sender's server;

in the mobile device, logic configured to send a request to the server serving the mobile device in response to receipt of the notification, wherein the request includes the network address of the sender's server;

in the server serving the mobile device, logic configured to retrieve the multimedia message from the sender's server through the network; and in the mobile device, logic configured to:

retrieve the multimedia message from the server serving the mobile device; and store the multimedia message in the mobile device.

12. The system of claim 11, wherein the mobile device is a mobile telephone.

13. The system of claim 11, further comprising a second mobile device having logic configured to send the multimedia message from the second mobile device to the sender's server.

14. The system of claim 13, wherein the mobile device and the second mobile device are mobile telephones.

15. The system of claim 14, wherein the mobile telephones are in a same or different public land mobile network (PLMN) addressed with Mobile Station Integrated Services Digital Network (MSISDN) identification numbers.

16. The system of claim 11, wherein the notification is sent from the sender's server to the mobile device using Short Messaging Service (SMS) as bearer and addressed to the mobile device's Mobile Station Integrated Services Digital Network (MSISDN) identification number.

17. The system of claim 11, wherein the sender's server and the server serving the mobile device are Multimedia Messaging Service (MMS) servers.

18. The system of claim 17, further comprising:

A Push Access Protocol (PAP) server associated with the mobile device, said PAP server having logic configured to:

receive the notification from the sender's MMS server; and send the notification from the PAP server to the mobile device, wherein the notification is a Wireless Application Protocol (WAP) Push.

19. The system of claim 18, further comprising logic in the mobile device configured to automatically retrieve the multimedia message by sending a hypertext transfer protocol (HTTP) GET request to the MMS Server of the mobile device in response to the WAP Push.

20. The system of claim 18, further comprising logic in a second mobile device configured to send the multimedia message from the second mobile device to the sender's MMS server.

* * * * *